(12) United States Patent
Peura et al.

(10) Patent No.: US 8,092,334 B2
(45) Date of Patent: Jan. 10, 2012

(54) TWO-STAGE TWO-SPEED FRONT DIFFERENTIAL

(75) Inventors: Brent Michael Peura, Farmington, MI (US); Nobushi Yamazaki, Ogama (JP)

(73) Assignee: GKN Driveline North America, Inc., Auburn Hills, MI (US)

( * ) Notice: Subject to any disclaimer, the term of this patent is extended or adjusted under 35 U.S.C. 154(b) by 935 days.

(21) Appl. No.: 12/050,153

(22) Filed: Mar. 17, 2008

(65) Prior Publication Data

US 2008/0227582 A1 Sep. 18, 2008

Related U.S. Application Data

(60) Provisional application No. 60/895,257, filed on Mar. 16, 2007.

(51) Int. Cl.
*F16H 37/08* (2006.01)

(52) U.S. Cl. .................................................. 475/200

(58) Field of Classification Search .......... 475/198–201, 475/204–206, 221; 180/247, 248, 233
See application file for complete search history.

(56) References Cited

U.S. PATENT DOCUMENTS

| | | | |
|---|---|---|---|
| 4,270,409 A | 6/1981 | Glaze et al. | |
| 4,417,642 A | 11/1983 | Suzuki et al. | |
| 5,183,132 A | 2/1993 | Fujisawa | |
| 5,330,030 A | 7/1994 | Eastman et al. | |
| 5,334,116 A | 8/1994 | Baxter, Jr. | |
| 5,346,442 A | 9/1994 | Eastman | |
| 5,503,603 A | 4/1996 | Adam et al. | |
| 5,566,805 A | 10/1996 | Sommer | |
| 5,597,369 A | 1/1997 | Brissenden et al. | |
| 5,599,249 A | 2/1997 | Zalewski et al. | |
| 5,609,540 A | 3/1997 | Brissenden et al. | |
| 5,662,543 A | 9/1997 | Forsyth | |
| 5,695,022 A | 12/1997 | Zalewski et al. | |
| 5,704,863 A | 1/1998 | Zalewski et al. | |
| 5,711,740 A | 1/1998 | Bakowski | |
| 5,725,453 A | 3/1998 | Zalewski et al. | |
| 5,833,566 A | 11/1998 | Showalter | |
| 5,836,847 A | 11/1998 | Pritchard | |
| 5,888,165 A * | 3/1999 | Besler et al. ................. | 475/204 |
| 5,902,205 A | 5/1999 | Williams | |
| 5,904,632 A | 5/1999 | Brown et al. | |
| 5,911,644 A | 6/1999 | Williams | |
| 5,916,051 A | 6/1999 | Schleuder et al. | |
| 5,947,858 A | 9/1999 | Williams | |
| 5,951,429 A | 9/1999 | Eastman | |
| 5,984,821 A | 11/1999 | Showalter | |
| 6,022,289 A | 2/2000 | Francis | |

(Continued)

*Primary Examiner* — Edwin A Young
*Assistant Examiner* — Huan Le
(74) *Attorney, Agent, or Firm* — Jennifer M. Brumbaug; Mick A. Nylander; Rader, Fishman & Grauer PLLC

(57) ABSTRACT

A variable speed front differential assembly for a vehicle is provided including a first side shaft, a second side shaft, and an input shaft. An offset differential case houses a differential mechanism engaging the first side shaft and the second side shaft. A speed selection assembly is movable from a first speed position to a second speed position. A speed reduction assembly is mounted adjacent the offset differential case. The speed selection assembly directly engages the offset differential case housing when in the first speed position such that a 1:1 drive ratio is achieved. The speed selection assembly engages the offset differential case through the speed reduction assembly when in the second speed position such that an increased drive ratio is achieved.

22 Claims, 5 Drawing Sheets

U.S. PATENT DOCUMENTS

| | | |
|---|---|---|
| 6,033,334 A | 3/2000 | Showalter |
| 6,152,848 A | 11/2000 | Williams et al. |
| 6,165,103 A | 12/2000 | Tenzor et al. |
| 6,193,629 B1 * | 2/2001 | Tenzor et al. ............... 477/124 |
| 6,464,612 B2 | 10/2002 | Frost |
| 6,557,680 B2 | 5/2003 | Williams |
| 6,565,475 B2 * | 5/2003 | Williams et al. ............. 475/204 |
| 6,572,506 B1 * | 6/2003 | Williams et al. ............. 475/204 |
| 6,575,867 B1 | 6/2003 | Stephens et al. |
| 6,579,205 B2 | 6/2003 | Williams |
| 6,589,128 B2 | 7/2003 | Bowen |
| 6,602,159 B1 | 8/2003 | Williams |
| 6,612,957 B2 | 9/2003 | Bansbach et al. |
| 6,629,474 B2 | 10/2003 | Williams |
| 6,645,109 B2 | 11/2003 | Williams et al. |
| 6,652,407 B2 | 11/2003 | Ronk et al. |
| 6,694,834 B2 | 2/2004 | Bansbach et al. |
| 6,709,357 B2 | 3/2004 | Schleuder et al. |
| 6,802,794 B2 | 10/2004 | Showalter |
| 6,814,682 B2 | 11/2004 | Spitale |
| 6,830,142 B2 | 12/2004 | Weilant |
| 6,837,819 B2 | 1/2005 | Foster |
| 6,905,436 B2 | 6/2005 | Mueller et al. |
| 6,926,634 B2 | 8/2005 | Haka |
| 6,935,981 B2 | 8/2005 | Nishiji |
| 6,942,592 B1 | 9/2005 | Haka |
| 7,004,875 B2 | 2/2006 | Williams et al. |
| 7,062,984 B2 | 6/2006 | Haka |
| 7,101,301 B2 | 9/2006 | Haka |
| 7,189,179 B2 | 3/2007 | Williams et al. |
| 7,377,871 B2 | 5/2008 | Bowen |
| 7,435,199 B2 | 10/2008 | Showalter |
| 7,491,145 B2 | 2/2009 | Mizon et al. |
| 2001/0036879 A1 | 11/2001 | Brown et al. |
| 2002/0035003 A1 | 3/2002 | Brown et al. |
| 2004/0226766 A1 * | 11/2004 | Cook et al. .................... 180/233 |
| 2004/0231944 A1 | 11/2004 | Dolan |
| 2006/0094556 A1 * | 5/2006 | Mizon et al. ................... 475/198 |
| 2007/0251345 A1 | 11/2007 | Kriebernegg et al. |
| 2008/0090692 A1 | 4/2008 | Gates |
| 2008/0227582 A1 | 9/2008 | Peura |
| 2008/0234091 A1 | 9/2008 | Ronk et al. |
| 2008/0300086 A1 | 12/2008 | Wheals |
| 2008/0300101 A1 | 12/2008 | Jarzyna et al. |

* cited by examiner

TWO-STAGE TWO-SPEED FRONT DIFFERENTIAL

TECHNICAL FIELD

The present invention relates to a front differential for an all-wheel drive vehicle. In particular, the invention concerns a two-stage two-speed front differential.

BACKGROUND OF THE INVENTION

Motor vehicles driven by a plurality of axles can be divided into those with a hang-on four-wheel drive wherein a primary axle is driven permanently and a secondary axle is connected if required; and those with a permanent four wheel drive wherein both axles are driven permanently. The design of the driveline is largely influenced by the arrangement of the engine in the motor vehicle, i.e. whether it is arranged in the front or at the rear and whether it is positioned in the longitudinal or transverse direction. At the same time, stringent packaging requirements exist regarding size, weight, and assembly costs of such systems.

In a typical front-wheel-drive based all-wheel-drive hang on layout, the engine is transversely mounted, and the front differential is included as part of the transmission assembly. The vehicle can be driven in an all-wheel-drive configuration by taking power off of the power takeoff unit and delivering it to the rear wheels. This can be accomplished by several known couplings, including on-demand couplings.

In vehicles where it is desirable to provide a very low range (creep) drive mode, however, the vehicle transmission may not provide a low enough drive ratio to enable a very low range drive ratio. This may be particularly true in cases of conventional transmission designs.

Thus, in front-wheel-drive based all-wheel-drive systems, there exists a need for reducing the drive speed of the power takeoff unit to enable a low range drive ratio.

SUMMARY OF THE INVENTION

The present invention provides a speed reduction assembly between the power takeoff unit and the front differential in a front-wheel-drive based all-wheel-drive system. In particular, the invention provides a two-stage, two-speed front differential enabling a very low final drive ratio. For example, the present invention is capable of providing a both a 1:1 drive ratio and a 3.35:1 drive ratio. Therefore, a variable speed front differential assembly for a vehicle is provided including a first side shaft, a second side shaft, and an input shaft. An offset differential case houses a differential mechanism engaging the first side shaft and the second side shaft. A speed selection assembly is movable from a first speed position to a second speed position. A speed reduction assembly is mounted adjacent the offset differential case. The speed selection assembly directly engages the offset differential case housing when in the first speed position such that a 1:1 drive ratio is achieved. The speed selection assembly engages the offset differential case through the speed reduction assembly when in the second speed position such that an increased drive ratio is achieved.

The present invention is advantageous in that two-stage aspect of the design permits design flexibility in terms of packaging constraints. As well, the speed reduction aspect provides a compact layout for enabling a low range.

Other advantages and features of the invention will become apparent to one of skill in the art upon reading the following detailed description with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

In the following description, various operating parameters and components are described for one constructed embodiment. These specific parameters and components are included as examples and are not meant to be limiting.

Figure 1:
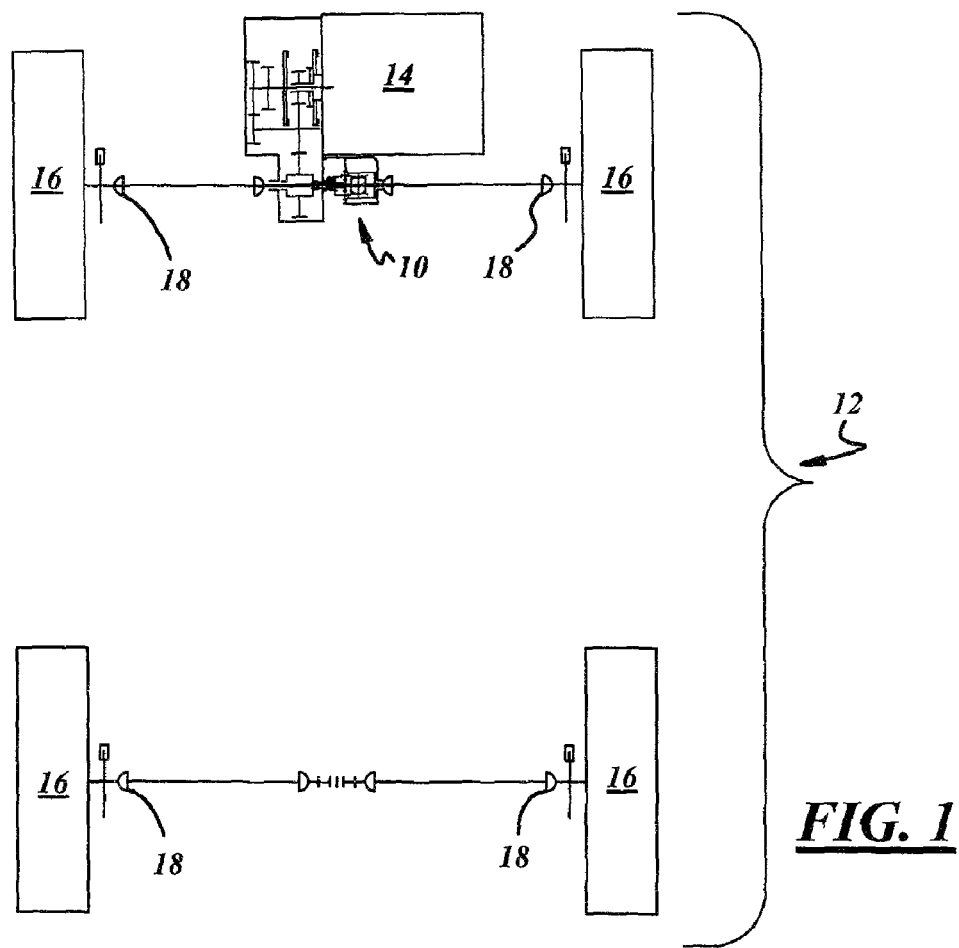
FIG. 1 is a schematic diagram of a two-stage, two-speed front differential design according to one embodiment of the present invention.
Figure 2:
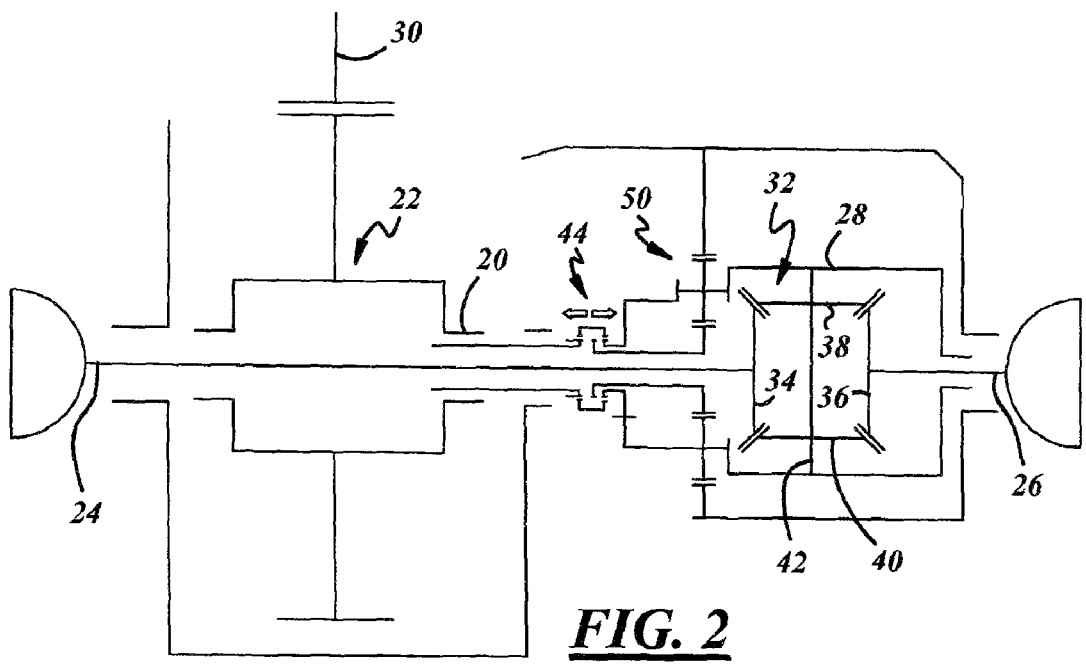
FIG. 2 is a torque stick diagram illustrating the two-speed front differential design illustrated in FIG. 1.
Figure 3:
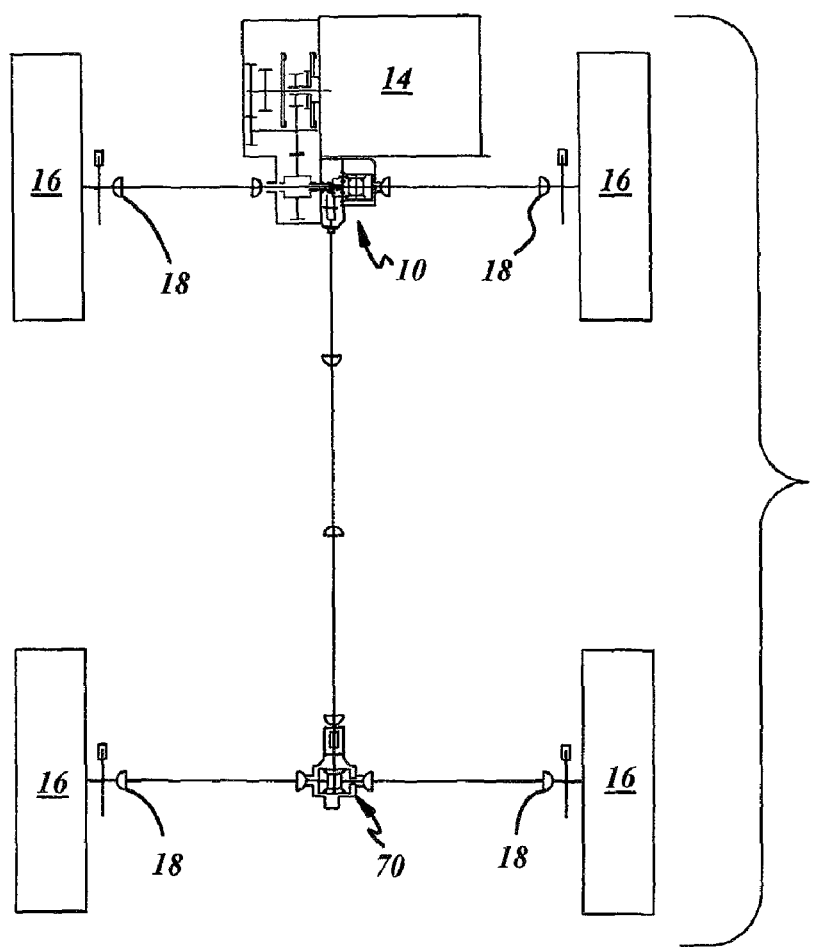
FIG. 3 is a schematic diagram of a two-stage, two-speed front differential design according to one embodiment of the present invention, the design illustrated with a rear wheel drive option.
Figure 4:
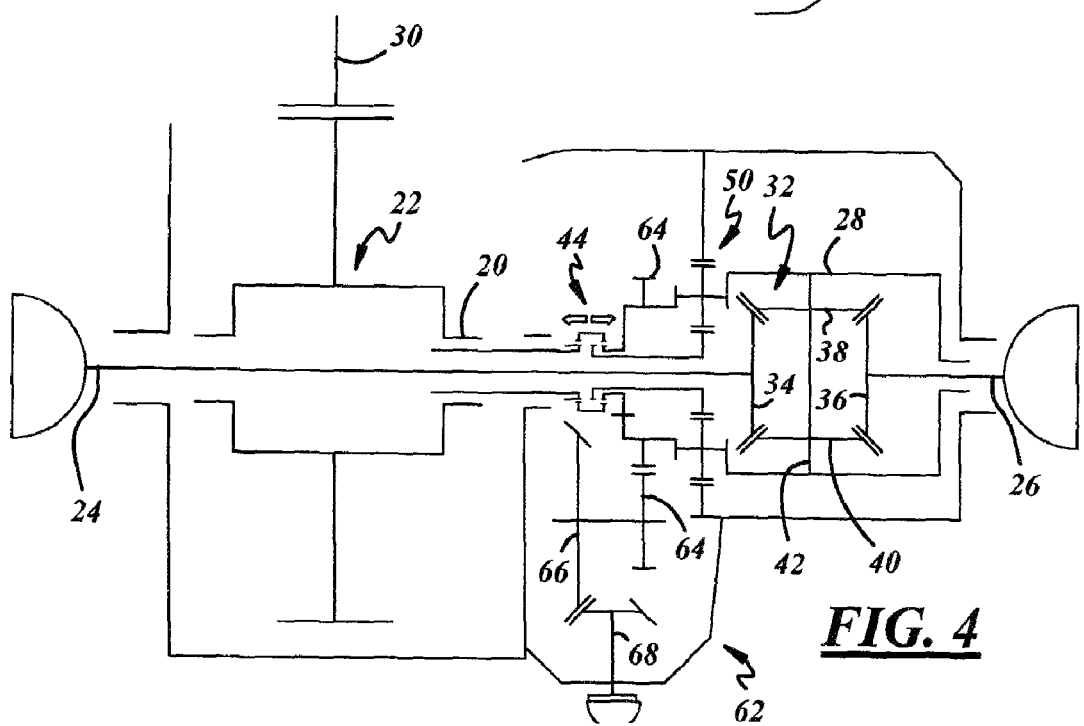
FIG. 4 is a torque stick diagram illustrating the two-speed front differential design illustrated in FIG. 3.

Referring now to FIGS. 1 and 2 which are schematics of a variable speed differential assembly 10 in accordance with the present invention. The vehicle 12, represented schematically, is illustrated as a front wheel drive vehicle with transverse engine 14 mounting. The vehicle 12 includes a plurality of wheels 16 and joints 18 as customary but is not intended to be limiting. Similarly, the engine 14 supplies torque to an input shaft 20 via a spool 22 or similar device. A first side shaft 24 and a second side shaft 26 meet in an offset differential case 28. The differential case 28 is offset and is not directly in line with the transverse final drive 30. Within the differential case 28 is contained a differential mechanism 32 engaging the side shafts 24,26. In one embodiment, it is contemplated that the differential mechanism 32 is comprised of side gears 34,36 mounted to the side shafts 24,26 and pinion gears 38,40 meshed thereto. The pinion gears 38,40 are held within the offset differential case 28 by way of a pinion shaft 42.

The present invention further includes a speed selection assembly 44 capable of selectively engaging the input shaft 20 and transferring torque to the offset differential case 28. The speed selection assembly 44 is movable between a first speed position 46 (see FIG. 7) and a second speed position 48

Figure 5:
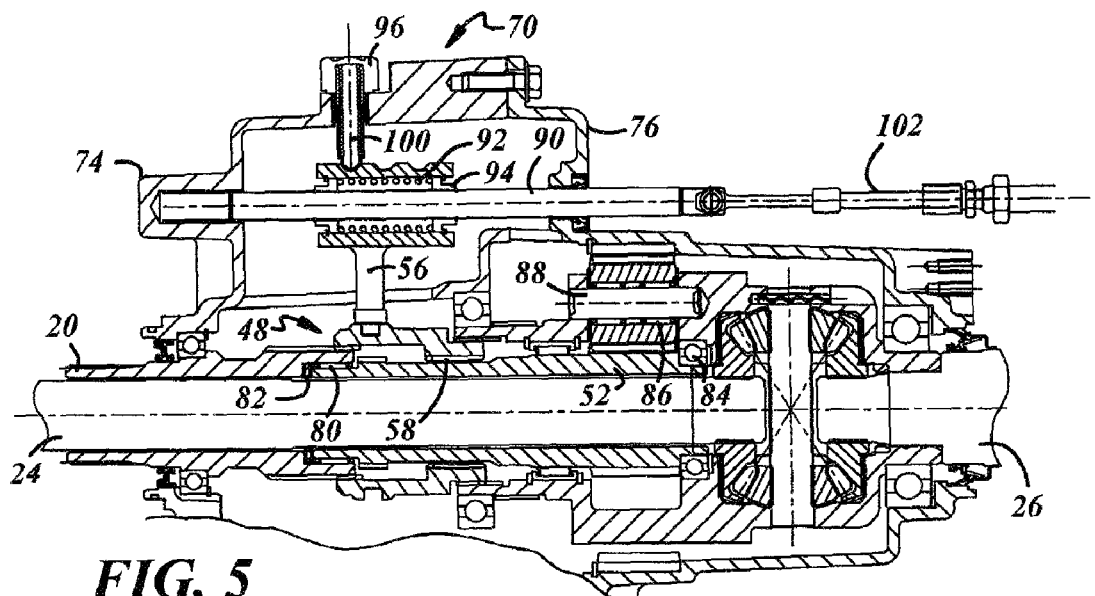
FIG. 5 is a cross sectional illustration of the two-speed front differential illustrated in FIG. 1, the differential illustrated in a second speed position.
Figure 8:
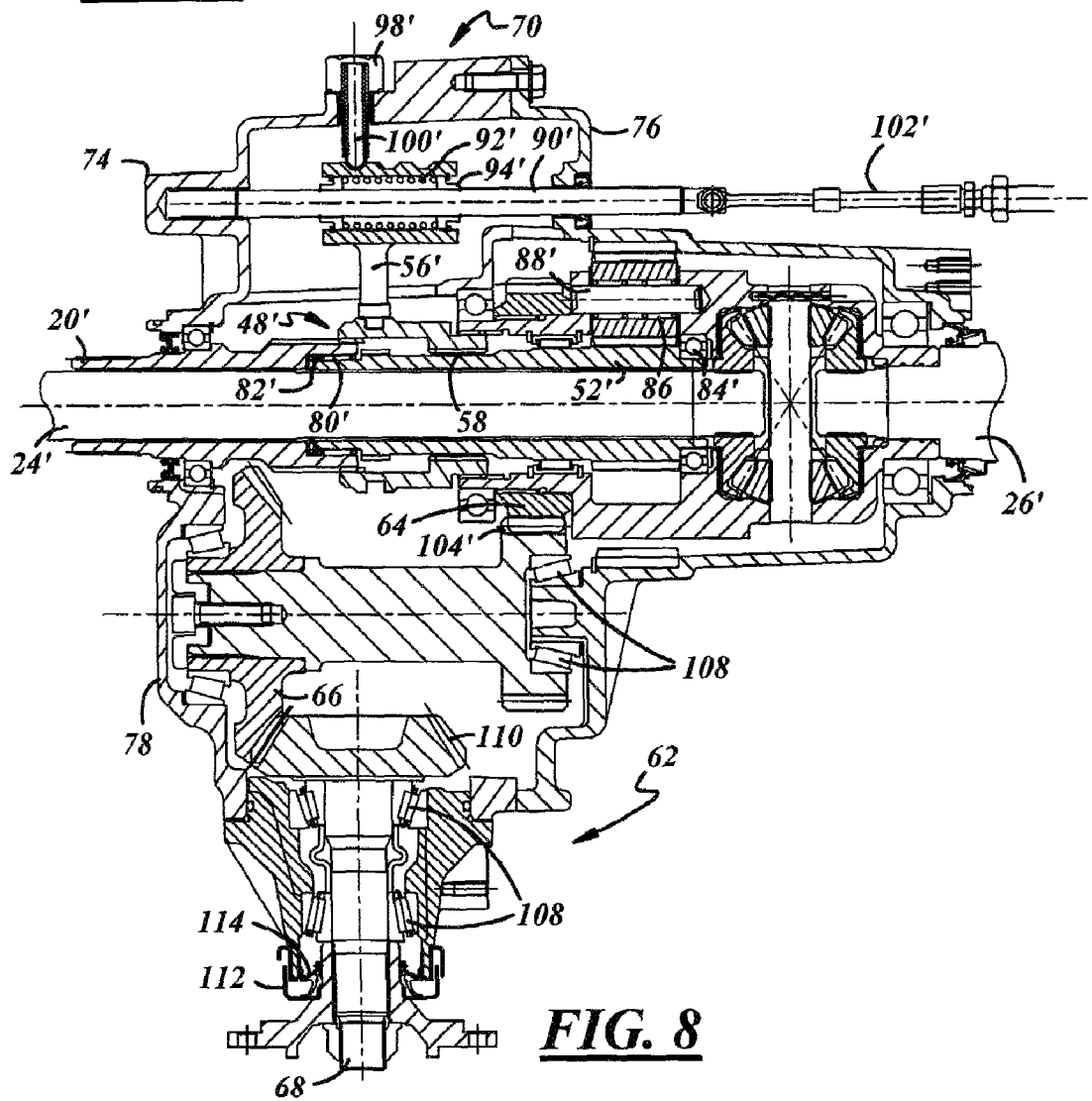
FIG. 8 is a cross sectional illustration of the two-speed front differential illustrated in FIG. 3, the differential illustrated in a second speed position.
Figure 6:
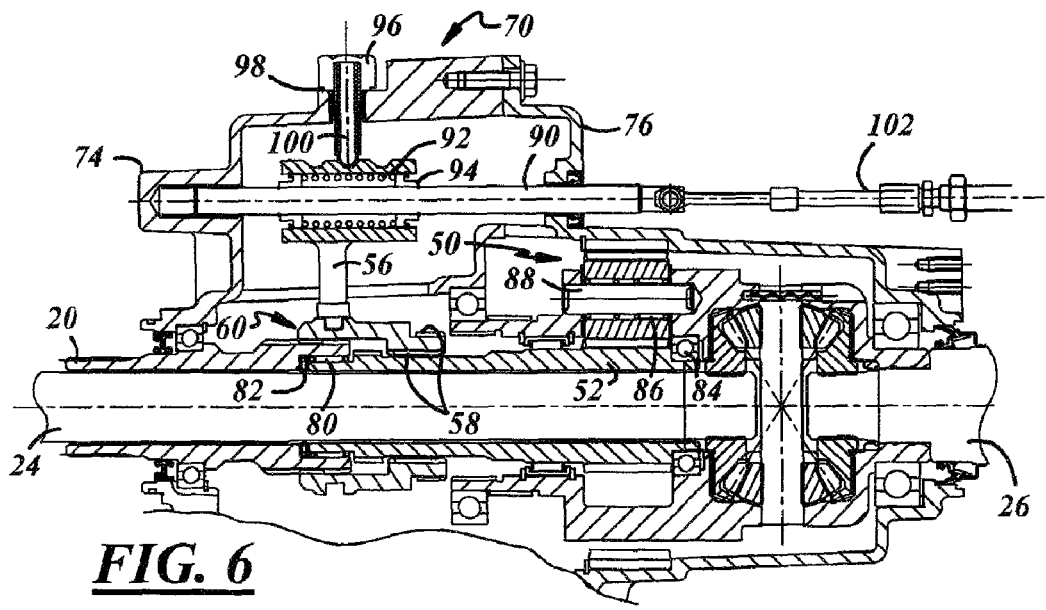
FIG. 6 is a cross sectional illustration of the two-speed front differential illustrated in FIG. 1, the differential illustrated in a neutral speed position.
Figure 9:
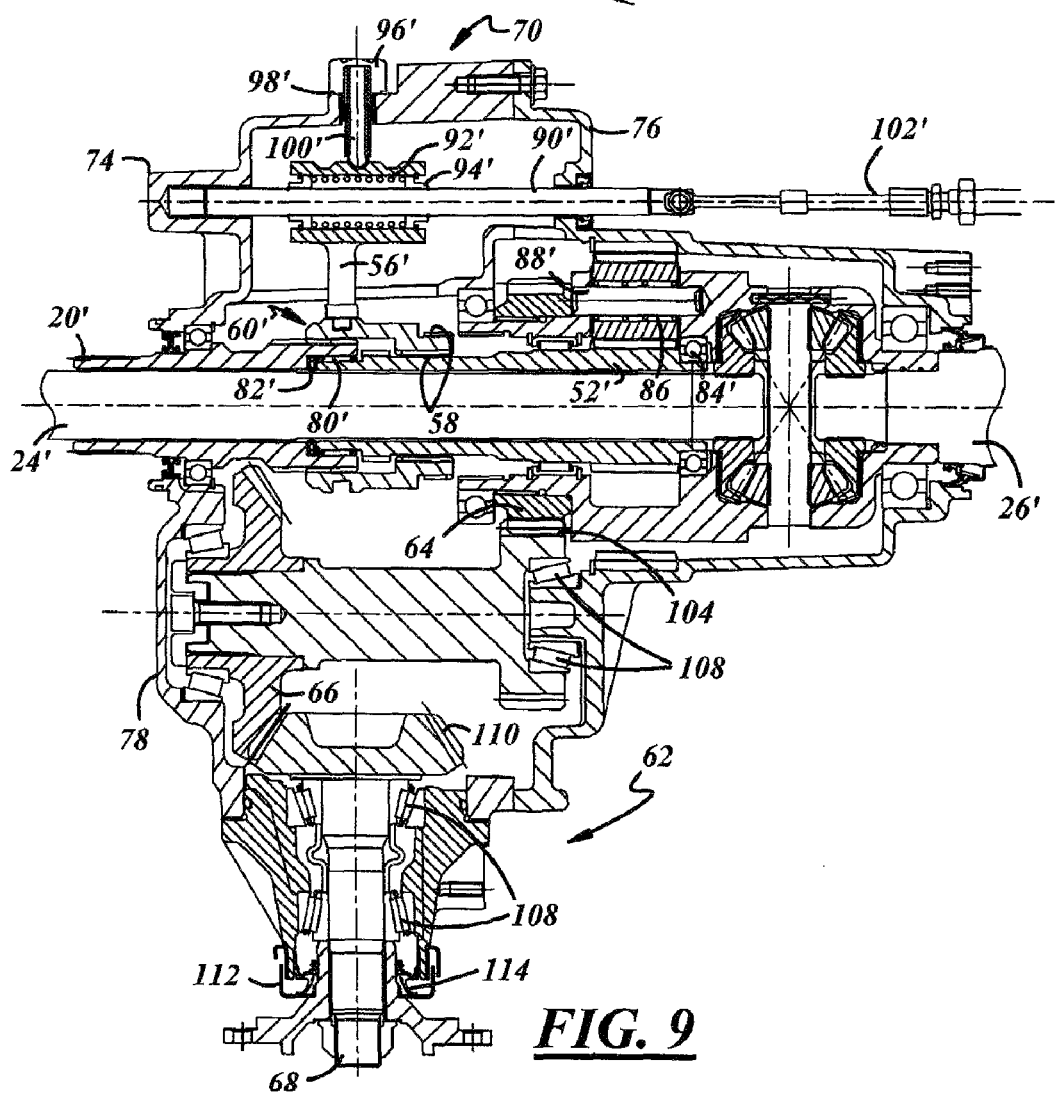
FIG. 9 is a cross sectional illustration of the two-speed front differential illustrated in FIG. 3, the differential illustrated in a neutral speed position.

(see FIG. 5). In the first speed position 46, the torque from the input shaft 20 is transferred directly to the offset differential case 28 to result in a 1:1 drive ratio. However, by moving the speed selection assembly 44 to the second speed position 48 the torque from the input shaft 20 is transferred through a speed reduction assembly 50. Although a variety of speed reduction assemblies are contemplated, one embodiment contemplates the use of a reduction gear assembly 50. In still another refinement, it is contemplated that the reduction gear assembly 50 is comprised of a sun gear 52 positioned around and sharing an axis with the first side shaft 24 and a plurality of planetary gears 54 positioned around the sun gear 52. By transferring the torque through this speed reducing devices a 3.351:1 drive ratio may be achieved. It should be understood that the precise drive ration may be modified through gearing to achieve a wide range of drive ratios. This allows the vehicle 12 to have a "low" drive feature for creeping. This has not be traditionally available on front wheel drive vehicles. Although it is contemplated that the speed selection assembly 44 may be controlled in a variety of fashions including, but not limited to, electronically or manually, in one embodiment it is contemplated that the speed selection assembly 44 by controlled via a shift fork 56 (see FIGS. 5-7).

Figure 7:
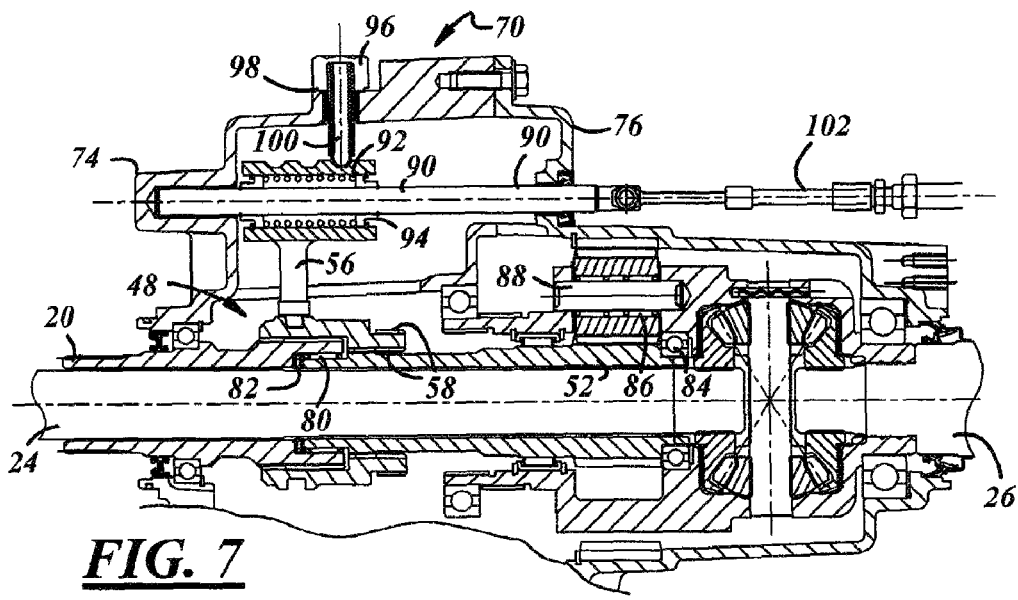
FIG. 7 is a cross sectional illustration of the two-speed front differential illustrated in FIG. 1, the differential illustrated in a first speed position.
Figure 10:
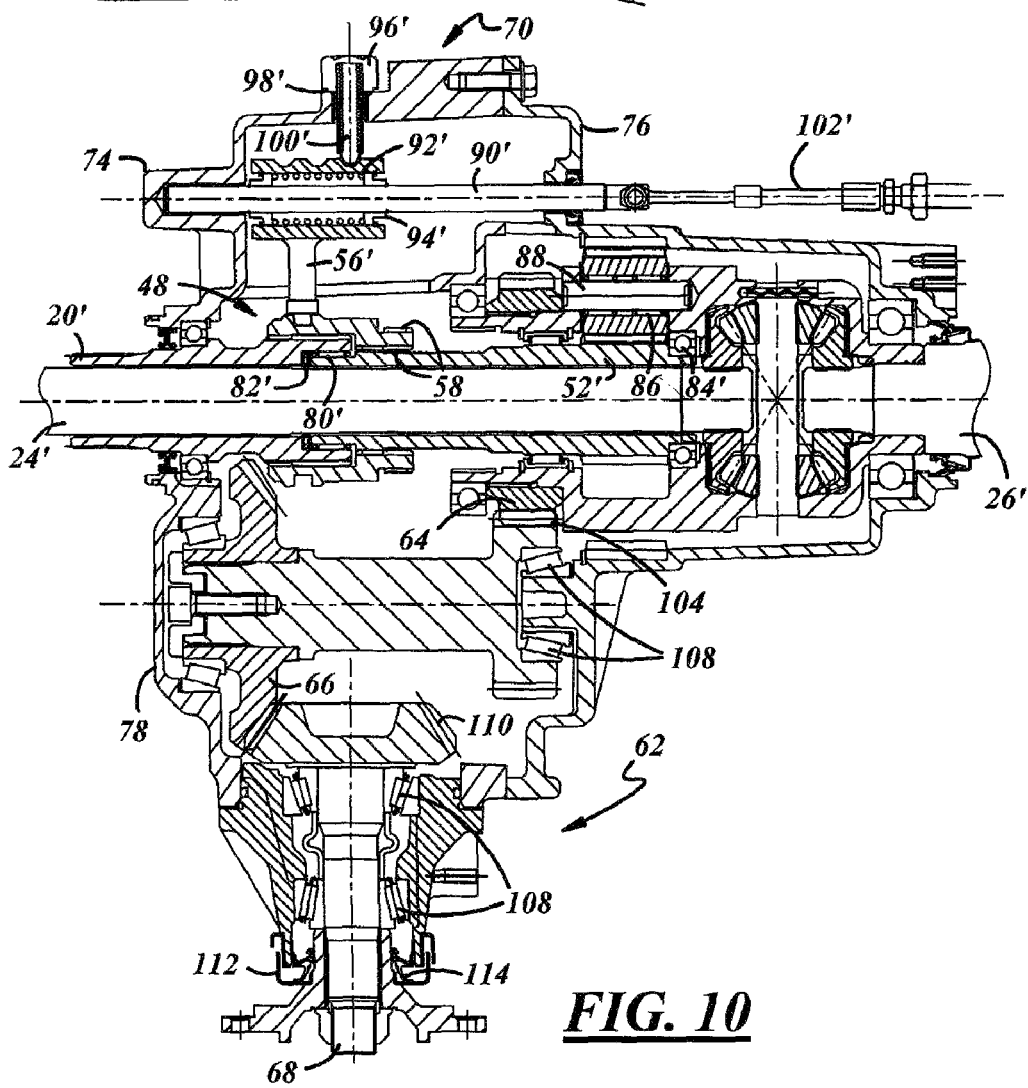
FIG. 10 is a cross sectional illustration of the two-speed front differential illustrated in FIG. 1, the differential illustrated in a first speed position

When the shift fork 56 moves the speed selection assembly 44 into the first speed position 46, sleeve splines 58 engage the input shaft 20 and provide direct torque from the input shaft 20 to the offset differential case 28 (FIG. 7). This generates the 1:1 drive ratio or "high" speed arrangement. The speed selection assembly 44 may also be shifted into a neutral speed position 60 (FIG. 6) wherein the speed selection assembly disengages the offset differential case 28 from the input shaft 20. Finally, the speed selection assembly 44 may be moved into the "low" speed arrangement in the second speed position 48 (FIG. 5). Here, the speed selection assembly 44 engages reduction gear assembly 50 and the speed of the input shaft 20 is reduced by gearing prior to transfer to the differential case 28.

The present invention may also be used in a four wheel drive solution as depicted in FIGS. 3-4 and 8-10. In this embodiment the variable speed differential assembly 10 further includes a rear wheel power takeoff unit 62. The rear wheel power takeoff unit 62 allows power to be transferred to the rear wheels for an all-wheel drive application. In this configuration, the rear wheel power takeoff unit 62 is mounted adjacent the offset differential case 28 and receives torque from the input shaft 20. Although this may be accomplished in a variety of fashions such as singe, double, or triple gearing, in the illustrated embodiment a helical gear assembly 64 engages the input shaft 20 and transfers torque to a hypoid gear assembly 66. The hypoid gear assembly 66 then transfers the power to a rear shaft 68 for transmission to a rear differential 70 and the rear wheels. It should be understood that the features of the variable speed front differential assembly 10 are identical in both embodiments and it is contemplated that the rear wheel power takeoff unit 62 may be added on to a variable speed front differential assembly 10 to add all wheel drive as an add-on feature. As such the structures shown in FIGS. 5-10 will now be discussed in greater detail.

The variable speed front differential assembly 10 includes a housing assembly 72 comprised of a left housing 74, a right housing 76, an a rear power takeoff housing 78. Into this housing assembly 72 runs the first side shaft 24, the second side shaft 26 and the input shaft 20. A thrust needle bearing 80 and a thrust needle washer 82 are positioned between the input shaft 20 and the sun gear 52. The sun gear 52 further has a sun ball bearing 84 between the sun gear 52 and the differential case 28. A needle bearing 86 may be used to support the planetary gears 54 around the planetary shaft 88. The shift fork 56 is mounted to a rod 90 by way of a rod spring 92 and a snap ring 94. An adjust bolt 96 and o-ring 98 control a piston 100 by which positioning of the shift fork 56 can be adjusted. A push pull cable 102 may be used for shift fork 56 actuation. An oil seal 104 seals the right housing 76 to the rod 90.

With regard to the rear wheel power takeoff unit 62 one of the helical gears 64 is preferably pressed into the differential case 28 and engages a second helical gear 104. The second helical gear 104 drives a secondary shaft 106 supported by taper bearings 108. This, in turn, turns the hypoid ring 66 which drives a drive pinion 110 of the rear shaft 68. The rear shaft 68 may also be supported by a plurality of taper bearings 108. Dust covers 112 and oil seals 114 may be used to protect the rear wheel power takeoff unit 62 from contamination.

From the foregoing, it can be seen that there has been brought to the art a new and improved front differential which has advantages over prior vehicle drive systems. While the invention has been described in connection with one or more embodiments, it should be understood that the invention is not limited to those embodiments.

What is claimed is:

1. A variable speed front differential assembly for a vehicle comprising:
    a first side shaft;
    a second side shaft;
    an input shaft surrounding a portion of said first side shaft;
    an offset differential case housing a differential mechanism engaging said first side shaft and said second side shaft;
    a speed selection assembly movable from a first speed position to a second speed position;
    wherein the speed selection assembly further comprises a sleeve member and an adjust bolt, wherein the sleeve member further comprises a series of engagement portions on an external surface of the sleeve member, wherein the adjust bolt is configured to selectively engage the engagement portions of the sleeve member to adjust the positioning of the speed selection assembly;
    a speed reduction assembly mounted adjacent said offset differential case;
    wherein said speed selection assembly directly engages said offset differential case housing when in said first speed position such that a 1:1 drive ratio is achieved, said speed selection assembly engaging said offset differential case through said speed reduction assembly when in said second speed position such that an increased drive ratio is achieved.

2. A variable speed front differential assembly as described in claim 1, wherein said speed selection assembly is further movable to a neutral speed position wherein said offset differential case is disengaged from said speed selection assembly.

3. A variable speed front differential assembly as described in claim 1, further comprising:
    a shift fork operatively engaged to said speed selection assembly, said shift fork controlling movement of said speed selection assembly.

4. A variable speed front differential assembly as described in claim 1, wherein said speed selection assembly comprises a sleeve spline.

5. A variable speed front differential assembly as described in claim 1, wherein said increased drive ratio comprises approximately 3.35:1.

6. A variable speed front differential assembly as described in claim 1, wherein said speed reduction assembly comprises:
    a sun gear mounted around said first side shaft; and a plurality of planetary gears mounted between said sun gear and said offset differential case.

7. A variable speed front differential assembly as described in claim 1, wherein said speed selection assembly further comprises a rod spring positioned within said sleeve member and a snap ring engaged with an end of said sleeve member.

8. A variable speed front differential assembly as described in claim 1, further comprising:
   a rear wheel power takeoff unit coupled to said input shaft, said rear wheel power takeoff mounted adjacent said offset differential case.

9. A variable speed front differential assembly as described in claim 8, wherein said rear wheel power takeoff unit comprises a two-stage gear assembly.

10. A variable speed front differential assembly as described in claim 8, wherein said rear wheel power takeoff unit comprises:
    a helical gear assembly engaged to said input shaft;
    a hypoid gear assembly engaged to said helical gear assembly; and
    a rear shaft engaged to said hypoid gear assembly;
    wherein torque is transferred from said input shaft through said helical gear assembly into said hypoid gear assembly and finally into said rear shaft.

11. A variable speed front differential assembly comprising:
    a first side shaft;
    a second side shaft;
    an input shaft surrounding a portion of said first side shaft;
    an offset differential case housing a differential mechanism engaging said first side shaft and said second side shaft;
    a rear wheel power takeoff unit coupled to said input shaft, said rear wheel power takeoff mounted adjacent said offset differential case;
    a speed selection assembly movable from a first speed position to a second speed position;
    wherein the speed selection assembly further comprises a first sleeve member, a second sleeve member, and an adjust bolt, wherein the first sleeve member further comprises a series of engagement portions on an external surface of the first sleeve member, wherein the adjust bolt is configured to selectively engage the engagement portions of the first sleeve member to adjust the positioning of the speed selection assembly;
    a reduction gear assembly mounted adjacent said offset differential case;
    wherein said second sleeve member of said speed selection assembly directly engages said offset differential case housing when in said first speed position such that a 1:1 drive ratio is achieved, said second sleeve member of said speed selection assembly engaging said offset differential case through said reduction gear assembly when in said second speed position such that an increased drive ratio is achieved.

12. A variable speed front differential assembly as described in claim 11, wherein said speed selection assembly is further movable to a neutral speed position wherein said offset differential case is disengaged.

13. A variable speed front differential assembly as described in claim 11, further comprising:
    a shift fork engaged to said speed selection assembly such that said shift fork is positioned between said first and second sleeve members, said shift fork configured for controlling movement of said speed selection assembly.

14. A variable speed front differential assembly as described in claim 11, wherein said second sleeve member of said speed selection assembly comprises a sleeve spline.

15. A variable speed front differential assembly as described in claim 11, wherein said increased drive ratio is between 2:1 and 4:1.

16. A variable speed front differential assembly as described in claim 11, wherein said reduction gear assembly comprises:
    a sun gear mounted around said first side shaft; and
    a plurality of planetary gears mounted between said sun gear and said offset differential case, said speed selection assembly engaging said sun gear when in said second speed position.

17. A variable speed front differential assembly as described in claim 11, wherein said rear wheel power takeoff unit comprises:
    a helical gear assembly engaged to said input shaft;
    a hypoid gear assembly engaged to said helical gear assembly; and
    a rear shaft engaged to said hypoid gear assembly;
    wherein torque is transferred from said input shaft through said helical gear assembly into said hypoid gear assembly and finally into said rear shaft.

18. A variable speed front differential assembly as described in claim 11 wherein said second sleeve member has a step configuration.

19. A method of controlling speed of a front differential assembly comprising:
    engaging a first side shaft and a second side shaft within an offset differential case housing;
    inputting torque from an input shaft;
    moving a speed selection assembly to a first speed position such that an adjust bolt engages a first engagement portion on a first sleeve member, wherein said speed selection assembly directly engages said offset differential case housing wherein a first drive ratio is achieved; and
    moving said speed selection assembly to a second speed position such that the adjust bolt engages a second engagement portion on the first sleeve member, wherein said speed selection assembly transfers torque from said input shaft through a reduction gear assembly to said offset differential case housing wherein a second drive ratio is achieved.

20. A method as described in claim 19, wherein said reduction gear assembly comprises:
    a sun gear mounted around said first side shaft; and
    a plurality of planetary gears mounted between said sun gear and said offset differential case, said speed selection assembly engaging said sun gear when in said second speed position.

21. A method as described in claim 19, further comprising transferring torque from said input shaft to a rear wheel power takeoff unit mounted adjacent said offset differential case.

22. A method as describe in claim 21, wherein said rear wheel power takeoff unit comprises:
    a helical gear assembly engaged to said input shaft;
    a hypoid gear assembly engaged to said helical gear assembly; and
    a rear shaft engaged to said hypoid gear assembly;
    wherein torque is transferred from said input shaft through said helical gear assembly into said hypoid gear assembly and finally into said rear shaft.

* * * * *